J. & J. INGHAM.
Wheel-Plow.
No. 65,087.  Patented May 28, 1867.
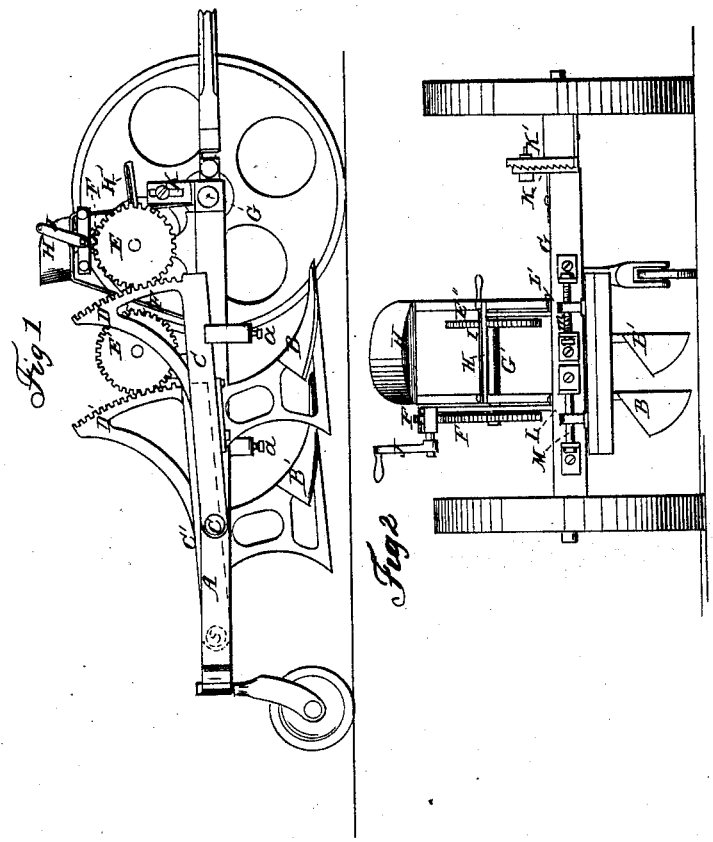
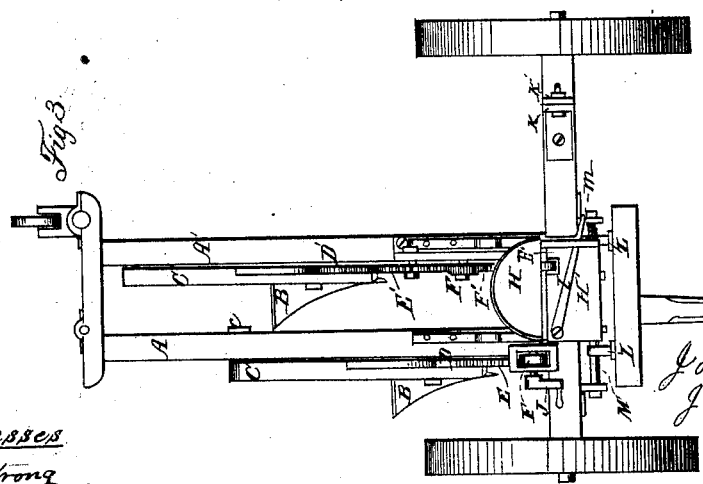
Witnesses
Geo. H. Strong
C. Wm. Smith
Inventor
Joseph Ingham
James Ingham
By Dewey & Co
Attys

United States Patent Office.

JOSEPH INGHAM AND JAMES INGHAM, OF SAN JOSÉ, CALIFORNIA.

Letters Patent No. 65,087, dated May 28, 1867.

---

IMPROVEMENT IN GANG-PLOUGHS.

---

*The Schedule referred to in these Letters Patent and making part of the same.*

---

TO ALL WHOM IT MAY CONCERN:

Be it known that we, JOSEPH INGHAM and JAMES INGHAM, of San José, Santa Clara county, State of California, have invented certain new and useful Improvements in Gang-Ploughs; and we do hereby declare the following description and accompanying drawings are sufficient to enable any person skilled in the art or science to which it most nearly appertains to make and use our said invention or improvements without further invention or experiment.

The nature of our invention is to provide an improved gang-plough, so constructed that the ploughs can be regulated by the operator from his seat; and consists of geared wheels and segments for raising and lowering the ploughs, and regulating their height by an adjusting-screw; also to a toothed connection of the axle, that, although the furrow-wheel may be the lowest, the axle will be horizontal; also to a device for shifting the draught connection from right to left; the whole being attached to a suitable frame mounted on wheels.

In order to more fully illustrate and describe our invention, reference is had to the accompanying drawings, and letters marked thereon, of which—

Figure 1. A and A' are parallel pieces composing the frame, and are attached to the axle G. The ploughs B and B' are attached to the independent bars C and C', which are connected to the parallel parts of the frame by loose bolts c and c'. Segmental racks D and D' are attached to each end of these bars, working in toothed wheels E and E' by the pinions F and F', the pinion F" being placed at the top of the wheel E, at the right hand of the driver's seat. The wheel E is attached to the axle G', and has a counterpart, E", between which and the wheel E' the pinion F works. The wheels and pinions are all raised above the frame, and operate in steps or brackets attached to it. The driver's seat H is placed above the forward toothed wheel, and beneath it is the foot-board H', having a lever, I, which fits between the cogs of the wheel E" and prevents the wheels and pinions from working. Within easy reach of the driver is a crank, J, which turns the pinion F', which operates or actuates the wheels E' and E", raising or lowering the racks D and D'; thus regulating the depth of the ploughs. Near the left-hand driving-wheel the axle G is divided, and has a toothed rack, K and K', strongly attached by bolts to each portion of it. This rack forms two upright pieces which are slotted, and in which a bolt and nut operate, holding them together. By this toothed rack and construction the ploughs will all have a corresponding depth, which is accomplished by raising or lowering the left wheel, so that the axle will be horizontal, although the furrow-wheel is always the lowest. In order to regulate the draught, the pole is attached to the machine, by means of two eyes L and L', one of which slides loosely on the bar M, while the other moves on a screw, m, passing through it, by means of which the pole may be moved from side to side and kept in place, thus changing position as the draught is greater on one side or the other. Set-screws a a supported by bands are placed under the bars C and C' to prevent the points of the ploughs from running too deep. By means of our improved mechanism, the depth at which the ploughs enter the soil may be regulated with great accuracy, and each plough be made to turn an equally deep furrow. The draught is also rendered equal in whatever soil the ploughs may be used.

Having thus described our invention, what we claim, and desire to secure by Letters Patent, is—

1. The movable pivoted bars C C', with the segments D D', wheels E E', and pinions F F', to raise and lower the ploughs, substantially as described.

2. The two-part axle G, with the vertical connecting-racks K K', to make the ploughs cut to an equal depth, as described.

3. The eyes L L', together with the bar M, and screw m, for the purpose of regulating the draught, substantially as described.

In witness whereof we have hereunto set our hands and affixed our seals.

JOSEPH INGHAM, [L. S.]
JAMES INGHAM. [L. S.]

Witnesses:
E. J. MORTON,
C. S. CRYDENWISE.